US008615325B2

(12) United States Patent
Li et al.

(10) Patent No.: US 8,615,325 B2
(45) Date of Patent: Dec. 24, 2013

(54) ADVANCED CONTROL SYSTEM FOR STEAM HYDROCARBON REFORMING FURNACES

(75) Inventors: Tong Li, Newark, DE (US); Justin Jian Wang, Bear, DE (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 239 days.

(21) Appl. No.: 12/963,963

(22) Filed: Dec. 9, 2010

(65) Prior Publication Data

US 2012/0078408 A1 Mar. 29, 2012

Related U.S. Application Data

(60) Provisional application No. 61/387,773, filed on Sep. 29, 2010.

(51) Int. Cl.
*G06F 19/00* (2011.01)

(52) U.S. Cl.
USPC ........... 700/271; 700/266; 700/268; 700/269; 700/272; 700/273; 700/274; 702/22; 702/31; 702/32; 422/105; 422/110; 422/111; 422/112; 422/116; 585/800; 585/899

(58) Field of Classification Search
USPC .......... 700/266, 268, 269, 271–274; 422/105, 422/110, 111, 112, 116; 585/800, 899
See application file for complete search history.

(56) References Cited

U.S. PATENT DOCUMENTS

| 4,187,542 A | 2/1980 | Ball et al. |
| 4,473,490 A | 9/1984 | Stewart |
| 6,013,172 A | 1/2000 | Chang et al. |
| 2007/0104641 A1 | 5/2007 | Ahmed et al. |
| 2009/0090311 A1* | 4/2009 | James et al. ................... 122/379 |

FOREIGN PATENT DOCUMENTS

EP 1787950 5/2007

OTHER PUBLICATIONS

PCT/US2011/053653, International Search Report and Written Opinion, issued Dec. 5, 2011.

* cited by examiner

*Primary Examiner* — Jyoti Nagpaul
*Assistant Examiner* — Shogo Sasaki
(74) *Attorney, Agent, or Firm* — Elwood L. Haynes

(57) ABSTRACT

Embodiments of the invention provide an advanced control system for steam hydrocarbon reformer furnaces, especially steam methane reformer furnaces. As described herein, the advanced control system may improve the control quality and efficiency of adjusting steam hydrocarbon reformer furnaces operating coefficients. As a result, the steam hydrocarbon reformer furnace operations become more stable, resulting in energy savings and improved furnace yield.

9 Claims, 5 Drawing Sheets

ADVANCED CONTROL SYSTEM FOR STEAM HYDROCARBON REFORMING FURNACES

CROSS-REFERENCE TO RELATED APPLICATIONS

This application claims the benefit of U.S. Provisional Application No. 61/387,773, filed Sep. 29, 2010, the entire contents of which are incorporated herein by reference.

BACKGROUND

Steam hydrocarbon reforming is a method of producing hydrogen and other useful products from hydrocarbon containing streams such as natural gas. Products are generated using a large furnace, referred to as a steam hydrocarbon reformer where steam is reacted with the hydrocarbon containing stream at high temperature in the presence of a catalyst. For example, a steam methane reformer may be used to convert methane ($CH_4$) into hydrogen gas ($H_2$) and carbon monoxide (CO). Other systems are then used to further convert and purify the products of the steam hydrocarbon reformer.

A steam hydrocarbon reformer generally includes an industrial furnace heated by many burners, with the number of burners determined by the size and shape of the furnace. For example, a large steam hydrocarbon reformer furnace can reach 20 m×20 m×14 m in size, with hundreds of burners mounted on the inside walls. Inside the furnace, there are also many tubes filled with catalyst running in parallel from the top to the bottom of the furnace. Inside the tubes, a hydrocarbon stream is reacted with steam in the presence of a metal (typically nickel (Ni)) containing catalyst in order to produce hydrogen gas and CO. Outside the tubes, a fuel stream is burned with air through the burners to provide the heat needed for the reforming reaction taking place inside of the tubes. The tube walls separate the reactant stream from the fuel stream.

A steam hydrocarbon reformer usually consumes large amounts of fuel during its operation. The performance of the reforming process, including the production yield and energy consumption, is affected by a number of factors, for example the flow rates of the fuel through the burners, the ratio of steam to methane in the hydrocarbon feed input stream, the flow rate of the hydrocarbon feed input stream, the temperature profile of the furnace, and the type/amount/quality of the catalyst. Typically, the purity, flow rate and/or temperature of the reformer product (among other things) are monitored and used to adjust some of the variables mentioned in an effort to achieve a desired production rate and yield of the output stream. For example, an automatic control system may adjust the ratio of steam to methane, or adjust the fuel and/or air flow rates to the burners in response to a scheduled plant rate change or observed changes in temperature, purity, product yield, etc.

However, current control systems used for the steam hydrocarbon reformer furnaces are relatively simple and may only include proportional-integral-derivative (PID) or ratio control loops to control the steam hydrocarbon reformer outlet temperature and steam to carbon ratio, etc. Although these controllers usually achieve their control objectives relatively well, they do not typically result in an optimal performance of the whole furnace or smooth transitions under the conditions of plant rate changes or large disturbances. For example, by using the simple lead-lag and ratio control mechanism to maintain the desired steam to carbon ratio, certain disturbances can be introduced to the furnace operation if the lead-lag time is not properly selected for each operating condition. Also, controlling only the outlet temperature (i.e., the temperature of the mixture of products from all the tubes of the reformer) does not always result in a smooth temperature distribution across the furnace, which may lead to more energy consumption or hot spots in certain places.

Obviously, running and maintaining a steam hydrocarbon reforming furnace can be expensive, and an important objective for the operation of such a furnace is to reduce the capital and operational costs.

SUMMARY

One embodiment of the present invention provides for a computer-implemented method of managing an operational state of a furnace in a steam hydrocarbon reformer unit. The method comprises determining a current operational state of the furnace in the steam hydrocarbon reformer unit, comparing the current operational state to a specified, preferred operational state, in response to determining that one or more elements of the current operational state deviates from the preferred operational state by a specified amount, matching, by a controller application executing on one or more processors, the current operational state to one or more operating scenarios stored in a database, each of the scenarios having been generated using a computational fluid dynamics (CFD) model of the steam hydrocarbon reformer furnace, and generating, based on the matched scenario, one or more adjustments to one or more operating parameters of the steam hydrocarbon reformer furnace, the one or more adjustments performed to return the furnace of the steam hydrocarbon reformer furnace to the specified, preferred operational state. Another embodiment of the present invention further provides for a computer-readable storage medium containing a program configured to manage the operational state of the furnace of a steam hydrocarbon reformer unit and a still further embodiment provides a system for doing the same.

BRIEF DESCRIPTION OF THE FIGURES

For a further understanding of the nature and objects of the present invention, reference should be made to the following detailed description, taken in conjunction with the accompanying figures, in which like elements are given the same or analogous reference numbers and wherein.

DESCRIPTION OF PREFERRED EMBODIMENTS

Figure 1:
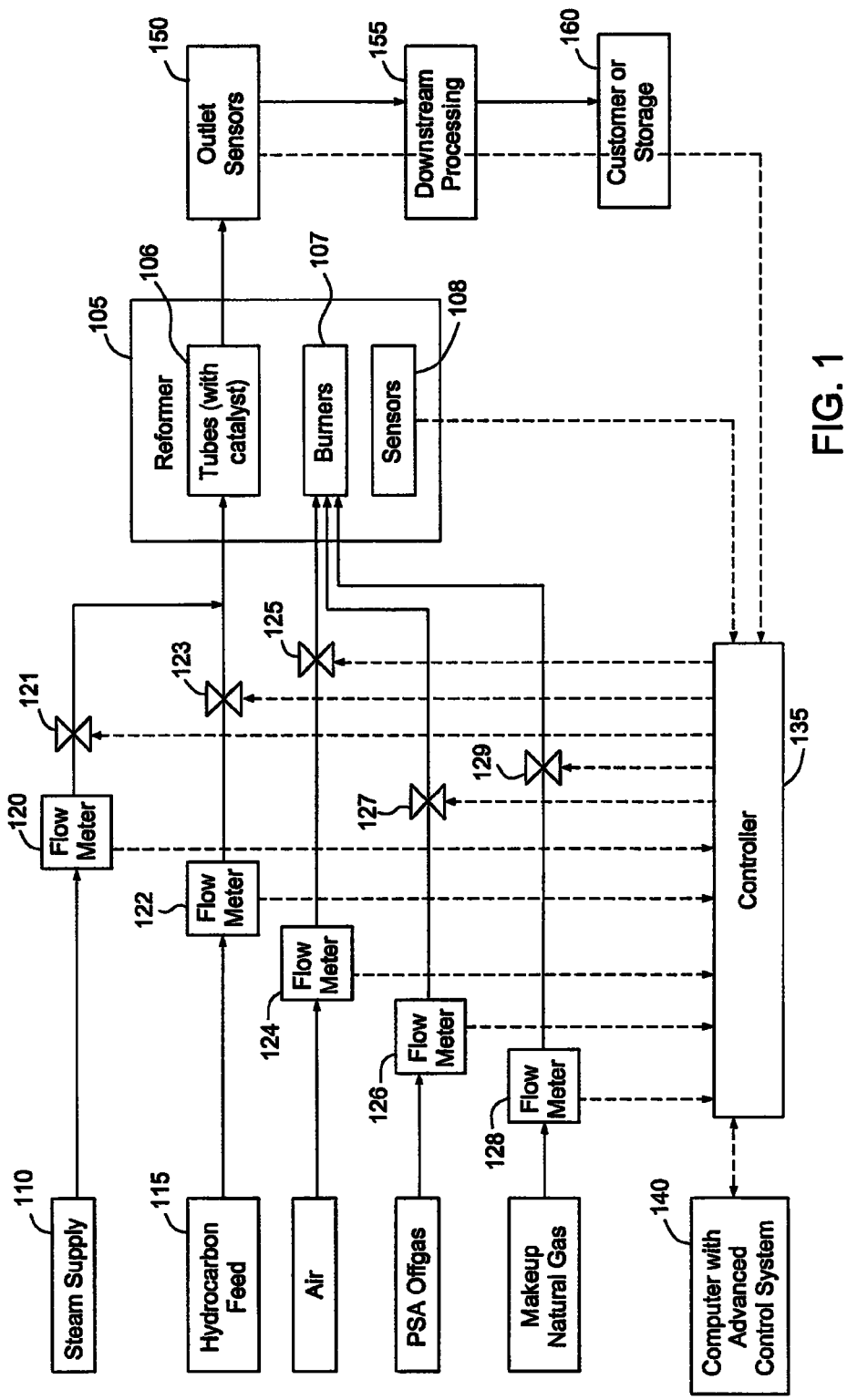
FIG. 1 is a conceptual illustration of a steam hydrocarbon reforming furnace, according to one embodiment of the invention.

Embodiments of the invention provide an advanced control system for steam hydrocarbon reforming furnaces, particularly for steam methane reforming furnaces. As described herein, the advanced control system may adjust a steam hydrocarbon reformer furnace's operating coefficients in an improved and more efficient way. As a result, the steam hydrocarbon reformer furnace's operations become smoother and more stable, resulting in improved furnace product yield, energy savings, and extended tube and/or catalyst life.

One method of the present invention comprises determining a current operational state of the steam hydrocarbon reformer furnace; comparing the current operational state to a specified, preferred operational state; determining that one or more elements of the current operational state deviates from the preferred operational state by a specified amount; matching, by a controller application executing on one or more processors, the current operational state to one or more operating scenarios stored in a database, each of the scenarios having been generated using a computational fluid dynamics (CFD) model of the steam hydrocarbon reformer furnace; and generating, based on the matched scenario, one or more adjustments to one or more operating parameters of the steam hydrocarbon reformer furnace, the one or more adjustments performed to return the steam hydrocarbon reformer furnace to the specified, preferred operational state. The method may further comprise performing the one or more adjustments to the one or more operating parameters of the steam hydrocarbon reformer furnace. The present invention also includes a computer-readable storage medium that contains a program configured to manage an operational state of a steam hydrocarbon reforming furnace, with the program including instructions for performing the method noted herein. The present invention further includes a system for managing an operational state of a steam hydrocarbon reformer furnace that is coupled to at least one controller, the controller comprising a processor and a memory storing a controller application wherein the controller application is configured to perform an operation as set forth in the method herein.

In one embodiment, an advanced control system for a steam hydrocarbon reformer furnace may include an offline simulation component and online control component. In the offline simulation part, CFD (Computational Fluid Dynamics) simulation is used to generate high-fidelity models based on plant design data as well as onsite measurements. Various typical operation scenarios may then be defined which may contain combinations of different loads and different types/levels of disturbances, e.g. from the pressure swing adsorption (PSA) unit because PSA off gas is used as fuel of the furnace. Based on the high-fidelity models, certain control strategies such as optimal control are used to design the corresponding control signals for each scenario, optimizing one or more performance indexes of steam hydrocarbon reformer furnace operation (especially steam methane reformer), e.g. minimizing the temperature variance all over the furnace. The resulting optimal control signals are saved in an expert system as fuzzy logic rules for online use. That is, for use during furnace operation. When this advanced system is put online, a fuzzy logic controller collects operators' inputs about furnace production load changes and then the existing operating conditions present in the steam hydrocarbon reformer furnace. Then, the fuzzy logic controller compares the current operation scenario with the calculated scenarios saved in the expert system, decides which scenarios are relevant, and infers the real control signals from the saved control actions of the relevant scenarios. The inferred control signals may then be used to control the steam hydrocarbon reformer furnace, e.g. adjusting the make-up natural gas rate and air rate to the burners. The reason to split the advanced control system into offline and online parts is that while the CFD simulation can generate high-fidelity models (which leads to improved control quality of steam hydrocarbon reformer furnaces), the computation usually takes a long time, often days, and cannot be used online in real time. So the advanced control system can harness the accuracy of CFD modeling and make it feasible for online control. Note that embodiments of the invention are described with respect to a steam hydrocarbon reformer furnace, with the preferred steam hydrocarbon reformer furnace being a steam methane reformer furnace. However, more generally, one of ordinary skill in the art will readily recognize that embodiments of the invention may be adapted for use with other hydrocarbon reforming furnaces, pre-reformers, water-gas shift reactors, or other industrial furnaces or reactors.

One embodiment of the invention may be implemented as one or more software programs for use with a computer system. The program(s) include instructions for performing embodiments of the invention (including the methods described herein) and may be stored on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD-ROM or DVD-ROM drive) and/or (ii) writable storage media on which alterable information is stored (e.g., floppy disks within a diskette drive, hard-disk drives, or flash memory devices). Other media include communications media through which information is conveyed to a computer, such as a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

Further, the description herein references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In general, the routines executed to implement the embodiments of the present invention may be part of an operating system or a specific application, component, program, module, object, or sequence of instructions. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a schematic illustration of a hydrocarbon reforming system 100, according to one embodiment of the invention. As shown, the hydrocarbon reforming system 100 includes a steam hydrocarbon reformer 105, which includes tubes filled with catalyst 106, burners 107 and thermal sensors 108 mounted inside the furnace. Steam delivered by a steam supply 110 and hydrocarbon feedstock (e.g., methane) delivered by a hydrocarbon feed 115 are mixed together before being sent to the tubes filled with catalyst 106 in the steam hydrocarbon reformer 105. A flow meter 120 monitors the flow rate of the steam supplied to the steam hydrocarbon reformer 105, which can be controlled by a control valve 121, based on the set point it receives from the advanced control system 140. Similarly, flow meters 122, 124, 126, and 128 each monitors flow rates of hydrocarbon feedstock, air, PSA offgas, and natural gas makeup supplied to the steam hydrocarbon reformer 105. These flow rates may be controlled by valves 123, 125, 127 and 129 correspondingly based on the set points from the advanced control system 140. The advanced control system 140 is connected to the flow meters 120, 122, 124, 126, and 128, furnace sensors 107, output sensors 108 and control valves 121, 123, 125, 127 and 129 through the regulatory control system 135 by signal lines. Sensors 108 monitor temperature at different points of the furnace, and output sensors monitor the product generated within the steam hydrocarbon reformer 105. For example, output sensors 150 may monitor flow rates, temperatures, pressures, and product purity. As described in greater detail below, the advanced control system 140 may send data to the controller 135, which in turn adjusts the operation of the steam hydrocarbon reformer 105 by sending the set points to the control valves 121, 123, 125, 127, and 129 based on load changes input by operators and real operational states observed by the flow meters 120, 122, 124, 126, and 128 and sensors 108, 150. The product generated in the steam hydrocarbon reformer 105 is passed to downstream processing systems 155, where it is purified and ultimately sent to customers through pipelines or storage 160 (e.g., pressurized tanks).

As is known, a steam hydrocarbon reforming process involves producing hydrogen gas and carbon monoxide gas from hydrocarbon streams. In a preferred embodiment, the steam hydrocarbon reforming process is a steam methane reforming process. More specifically, with regard to general steam hydrocarbon reforming processes, a hydrocarbon feed gas is fed into an steam hydrocarbon reformer device (e.g., steam hydrocarbon reformer 105), where methane in the feed gas reacts with steam at high temperatures (from about 700° C. to about 1100° C.) in the presence of a metal-based catalyst such as a nickel catalyst to produce a steam hydrocarbon reformer product. Such units and their general conditions of operation are known in the art. The hydrogen rich stream produced in such steam hydrocarbon reformer units is typically passed along for further treatment in various units such as a water gas shift unit to further convert carbon monoxide into hydrogen and/or a hydrogen pressure swing adsorption (PSA) unit to purify the hydrogen stream (represented in FIG. 1 as downstream processing 155).

Regarding the actual steam hydrocarbon reformer process, the first stage of the process involves the introduction of one or more hydrocarbon feed streams 115 (also referred to herein as one or more hydrocarbon feed gases) along with steam supply 110 into the steam hydrocarbon reformer 105. Prior to being introduced into the steam hydrocarbon reformer 105, the one or more hydrocarbon feeds 115 are typically compressed, e.g., to about 200 to 600 psig, and combined with high pressure steam provided by steam supply 110, which is at about 700 psig, before entering the steam hydrocarbon reformer 105. The reformer 105 typically contains a series of tubes that are packed with catalyst through which the steam and hydrocarbon mixture passes. The elevated temperature (around 700° C. to 1100° C.) drives the reaction which is endothermic. As shown, the reformer includes burners 107 used to maintain the temperature within the reformer at a desired temperature and sensors 109 used to monitor the operational state of the reformer (e.g., temperatures, pressures, etc.).

One of ordinary skill in the art will recognize that the illustration of the hydrocarbon reforming system 100 shown in FIG. 1 is simplified in order to present aspects of the present invention, and that in practice a hydrocarbon reforming system will include a variety of additional systems and components. Additionally, as used herein, "steam hydrocarbon reformer unit" or "steam methane reformer unit" refers not only to the reformer, but also to all of the additional components that typically are considered to make up a steam hydrocarbon reformer, including, but not limited to, one or more components selected from heat exchangers, burners, pre-reformer units, the actual reformer which includes the reaction chamber, tubes with one or more types of catalyst contained in a variety of tubes and placed in the reaction chamber, etc. Note also, a steam methane reformer unit is considered to be a specific type of steam hydrocarbon reformer unit and is generally the preferred type of steam hydrocarbon reformer unit.

The goal of the steam hydrocarbon reformer unit is to produce a product stream that contains hydrogen, carbon monoxide, methane, water and carbon dioxide in proportions close to equilibrium amounts at the elevated temperature and pressure, with the overall goal being to maximize the production of hydrogen and/or carbon monoxide. Due to the nature of the steam hydrocarbon reformer unit, there are a variety of factors which can influence the final steam hydrocarbon reformer product stream. For example, one factor is the source of the hydrocarbon stream which is a limiting factor with regard to the chemical components that are available for reacting. Another factor is the placement of the burners in relation to the actual tubes that contain catalyst.

Still another factor is the heat distribution within the steam hydrocarbon reformer furnace chamber at any given moment. An even distribution of heat on different cross sections and a certain temperature profile along the reaction flow direction in the unit are necessary to assure smooth operation and consistent product from the steam hydrocarbon reformer furnace as well as to prevent unwanted failures for components of the steam hydrocarbon reformer furnace. For example, an uneven or inconsistent combustion throughout the furnace can result in hot spots on tubes which may shorten the tube/catalyst life cycle and/or cause a reduced conversion rate. In these cases, the cost associated with each of these failures can be huge (the necessity to replace the catalyst filled tubes and the extra effort needed for the treatment of the resulting product stream downstream to separate the desired components—the production of hydrogen is less than expected quantity compared to the other components in the steam hydrocarbon reformer product stream).

Accordingly, the controller 135 may be configured to optimize the reaction conditions that occur in the steam hydrocarbon reformer 105 to increase the production of hydrogen and or carbon monoxide in relation to the other components in the product stream as well as reduce the power/fuel requirements used to operate the steam hydrocarbon reformer 105. For example, the controller 135 may be configured to adjust the input flow rates of the steam supply 110 and/or the hydrocarbon feed 115 based on feedback received from sensors 109 and output sensors 150.

Figure 2:
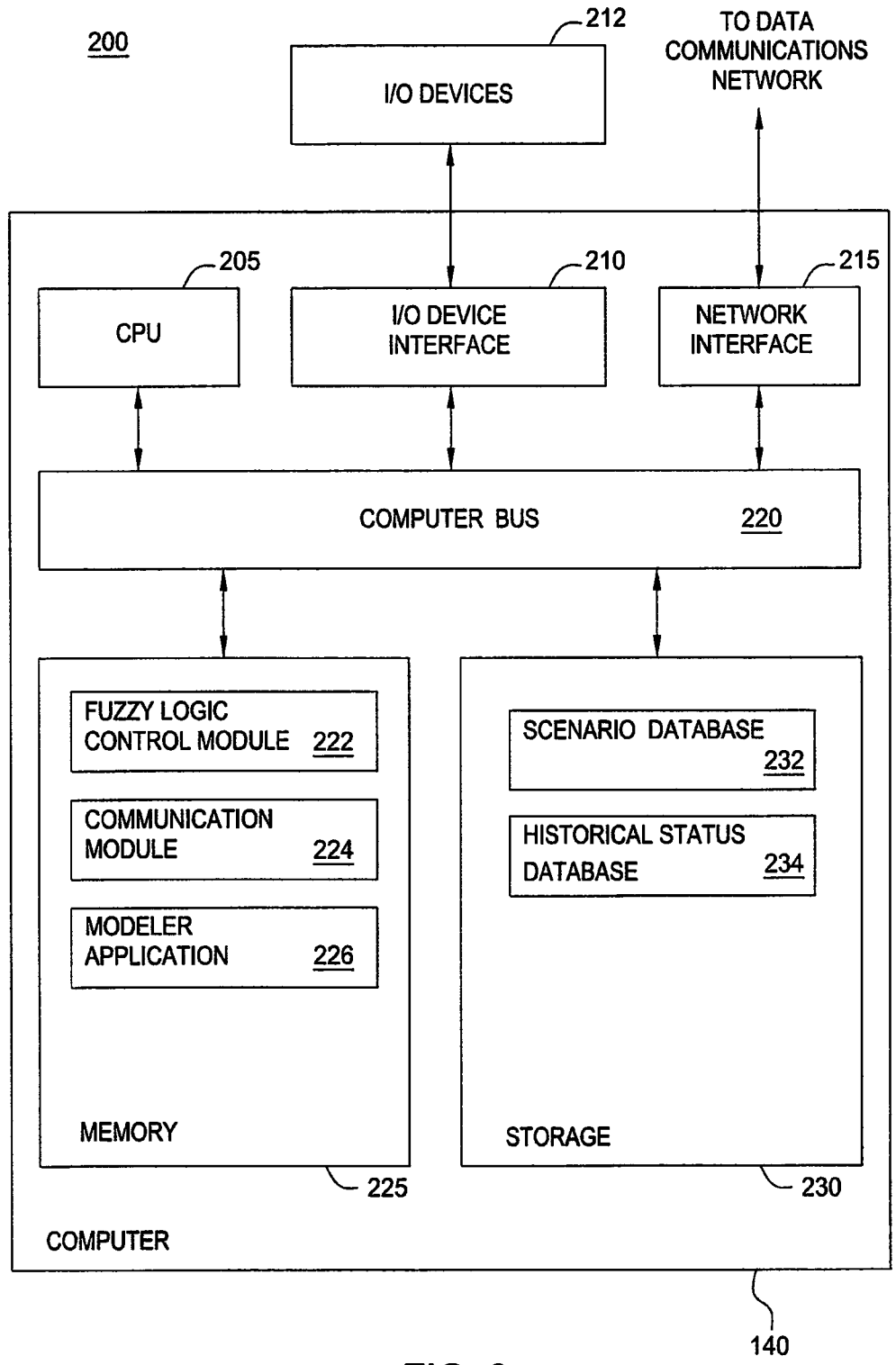
FIG. 2 illustrates an example implementation of the advanced control system in a computer system, according to one embodiment of the invention.

FIG. 2 illustrates an example implementation of the advanced control system in a computer system 140, according to one embodiment of the invention. As shown, the computer system 140 includes, without limitation, a central processing unit (CPU) 205, network interface 215, computer bus 220, memory 225, and storage 230. The computer system 140 may also include an I/O device interface 210 used to connect I/O devices 212 (e.g., keyboard, mouse and display devices) to the computer system 140. Operators can use the I/O devices to input production schedule to the fuzzy logic control module 222, control its running and visualize its results.

When the advanced control system runs online, the fuzzy logic control module 222 is usually loaded into the memory 225. The CPU 205 retrieves and executes program instructions stored in the module. There may also be a communication module 224 configured to allows the fuzzy logic control module 222 to exchange real time or archived data with other software programs running either in the same computer or in computers/devices connected through network. The real time data may include the flow rates and temperatures of steam, hydrocarbon feed, air, PSA offgas, and makeup natural gas, the hydrocarbon feed concentration, the heating values of PSA offgas and makeup natural gas, the temperature measurements from the sensors inside the furnace, the measurements of product temperature, flow rate and concentrations from outlet sensors, etc. Such data may be used by the fuzzy logic control module 222 and stored in the historical status database 234 together with their time stamp on either a periodic or exception basis (or both). When the fuzzy logic control module 222 calculates control output (i.e., settings for values and burners in the furnace), it may access the scenario database 232 in the storage 230 and retrieve the control actions saved there for different scenarios. The computer bus 220 is used to transmit program instructions and application data between the CPU 205, I/O devices interface 210, memory 225, network interface 215, and storage 230. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In one embodiment, the fuzzy logic control module 222 provides a software application configured to monitor and adjust the operational state of a steam hydrocarbon reformer unit (e.g., a steam methane reformer unit) to help maintain or achieve a desired operational state. When running online, the fuzzy logic control module 222 can obtain the current operational condition of the steam hydrocarbon reformer. It may also retrieve the past operational conditions of the reformer back to a certain time horizon. The current and past operational conditions define the reformer's current operational state. Then fuzzy logic control module 222 may compare the current operational state to a specified optimal state. In such a comparison, data defining the operational state is usually categorized into two types of indexes: uncontrollable variables and controllable variables. For example, uncontrollable variables may include the product load set by operators, the current measurements of furnace temperature outlet temperature, PSA offgas flow rate the current and heating value, makeup natural gas heating value, and the hydrocarbon feed concentration, as well as all the past data. Controllable variables may include the steam to hydrocarbon ratio, the makeup natural gas or air flow rates to the furnace or to certain burners, the hydrocarbon or steam flow to the furnace or to certain tubes. The comparison may be used to determine whether the current controllable variable values are close to the controllable variable values of a predefined scenario whose uncontrollable values are close to current ones. In one embodiment, if such a scenario does not exist within the scenario database 232, it can be generated by the rules stored in the fuzzy logic control module 222. If the current operational state deviates from the desired operational state to a certain degree, then the fuzzy logic controller 222 may adjust one or more of the controllable variables to bring the steam hydrocarbon reformer back to the desired operational state. As used herein, the phrase "operating parameters" includes one or more, preferably two or more, parameters selected from inlet stream pressure, outlet stream pressure, inlet temperature, outlet temperature, inlet mixture, reaction temperature, burner fuel flow rates, and outlet composition. In order to generate the corresponding control scheme, the fuzzy logic controller 222 may identify which predefined scenario (or scenarios) in the scenario database 232 is related to the current state, then retrieve the pre-calculated control actions associated with these scenarios, and determine the current control actions from them by the rules defined in the fuzzy logic control module 222. The final control scheme usually adjusts multiple variables together over a certain period of future time. For example, when a hot spot develops in one region of the steam hydrocarbon reformer (determined, e.g., by evaluating the data obtained from one or more of the sensors 108), the controller application may adjust the makeup natural gas and air flow rates to certain burners (e.g. burners around the hot region) and the flow rates of the mixture of hydrocarbon and steam to certain tubes (e.g. tubes in or near the hot region) step by step in a certain pattern. More generally, the fuzzy logic control module 222 use the scenario database 232 to adjust the operations of the steam hydrocarbon reformer as a whole, as opposed to simply adjusting one setting, as current systems do. Doing so helps avoid a scenario where the fuzzy logic control module 222 is always chasing the next parameter that falls out of adjustment in response to correcting another parameter.

The modeler application 226 may be configured to generate a model of a given steam hydrocarbon reformer. As noted, the models 238 may include models based on computational fluid dynamic (CFD) simulations of the steam hydrocarbon reformer being operated using different parameters. The scenario database 232 stores the results of simulating different scenarios of how the steam hydrocarbon reformer may operate. Such scenarios may be used by the fuzzy logic control module 222 to determine a sequence of actions to perform to bring an out-of-adjustment steam hydrocarbon reformer back to a desired operational state.

Figure 3:
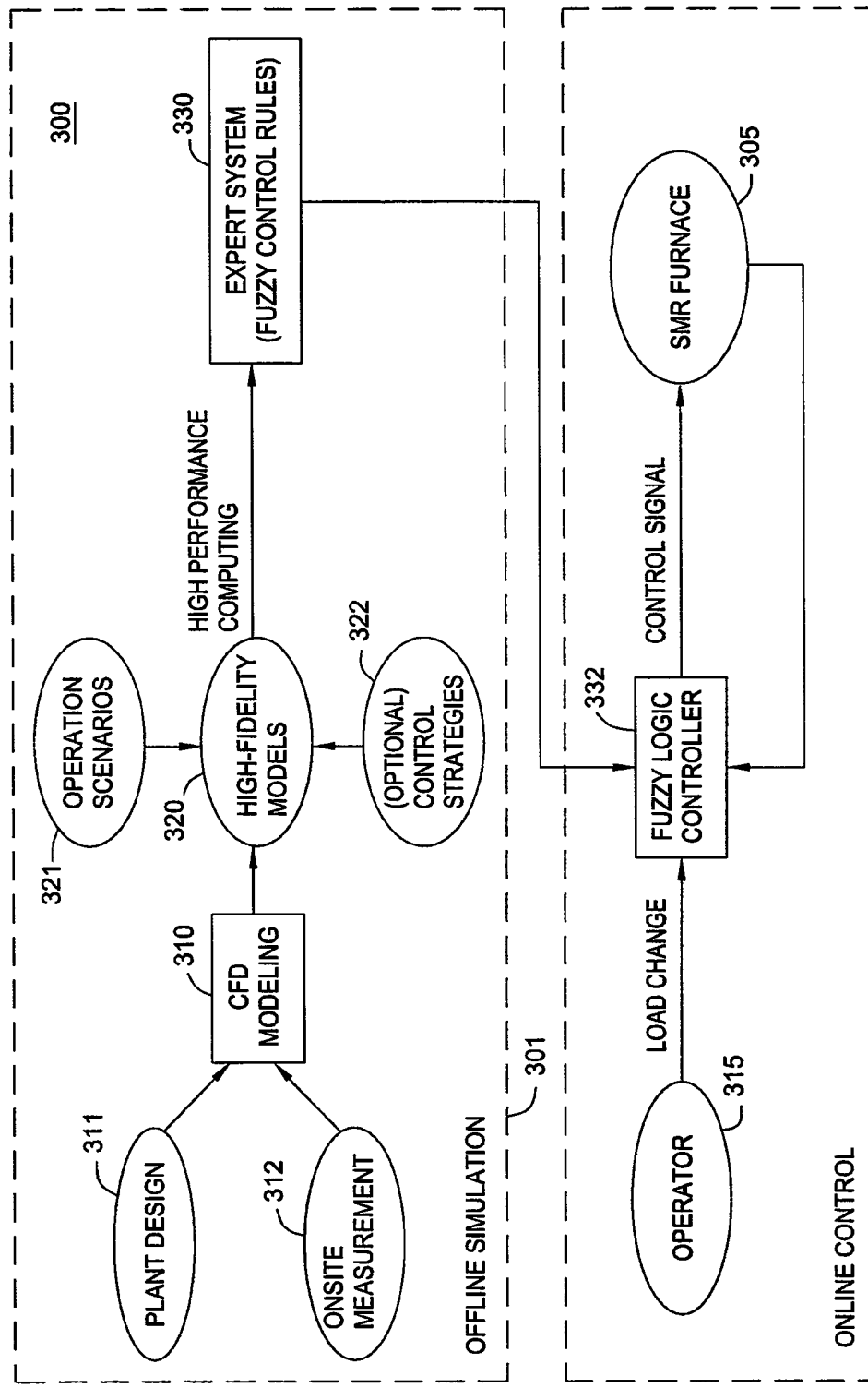
FIG. 3 illustrates how the advanced control system first shown in FIG. 2 is generated offline in system and implemented online in system, according to one embodiment of the invention.

For example, FIG. 3 illustrates how the advanced control system first shown in FIG. 2 is generated offline in system 310 and implemented online in system 302, according to one embodiment of the invention. Based on the steam methane reformer plant design 311, especially the furnace design, and onsite measurements 312 of information not specified in the plant design 311, computational fluid dynamic (CFD) modeling methodologies, may be used to generate high-fidelity models of steam methane reformer furnaces 320. Once generated, different operation scenarios 321 may be defined, based on a specific steam methane reformer furnace. For example, operation scenarios 321 can be combinations of different production loads and different types of disturbances expected to happen during steam methane reformer furnace operation. For each operation scenario 321, control actions can be designed to optimize one or more furnace operation criteria, e.g. to minimize the temperature variation of the spot in the furnace whose temperature variation will be the largest under this scenario. Due to the complexity of the model and operation scenarios, directly solving for the control actions by optimizing such criteria may not be feasible. Instead, multiple control plans can be tried and simulated with the CFD model under the guidance of either operation experience or certain control theories, e.g. optimal control (usually both). And certain engineering judgment or mathematical criteria can be used to select the best control plan. The resulting control actions together with the scenario definition are stored in the expert system 330 as the fuzzy logic control rule for this scenario. When the control system 302 is used online, the expert system 330 is copied to the storage 230 to serve as the scenario database 232. The expert system 330 can be expanded by including more scenarios and performing corresponding simulations in the offline system 301, and the resulting expanded expert system can be copied to the online system 302. In operation, the online measurements of the steam hydrocarbon reformer furnace 305, as well as the scheduled load changes specified by an operator 315 (if any), are supplied to the fuzzy logic controller 332, which controls the operational state of the steam hydrocarbon reformer furnace 305 as described above. Doing so allows the fuzzy logic controller 332 to improve the control quality and efficiency, and respond and adjust operating coefficients of the steam hydrocarbon reformer furnace 305 more effectively. Therefore, the operations of the steam hydrocarbon reformer furnace 305 are more stable, disturbance of the furnace operation is reduced, furnace energy consumption can be saved, and furnace product yield can be improved.

Figure 4:
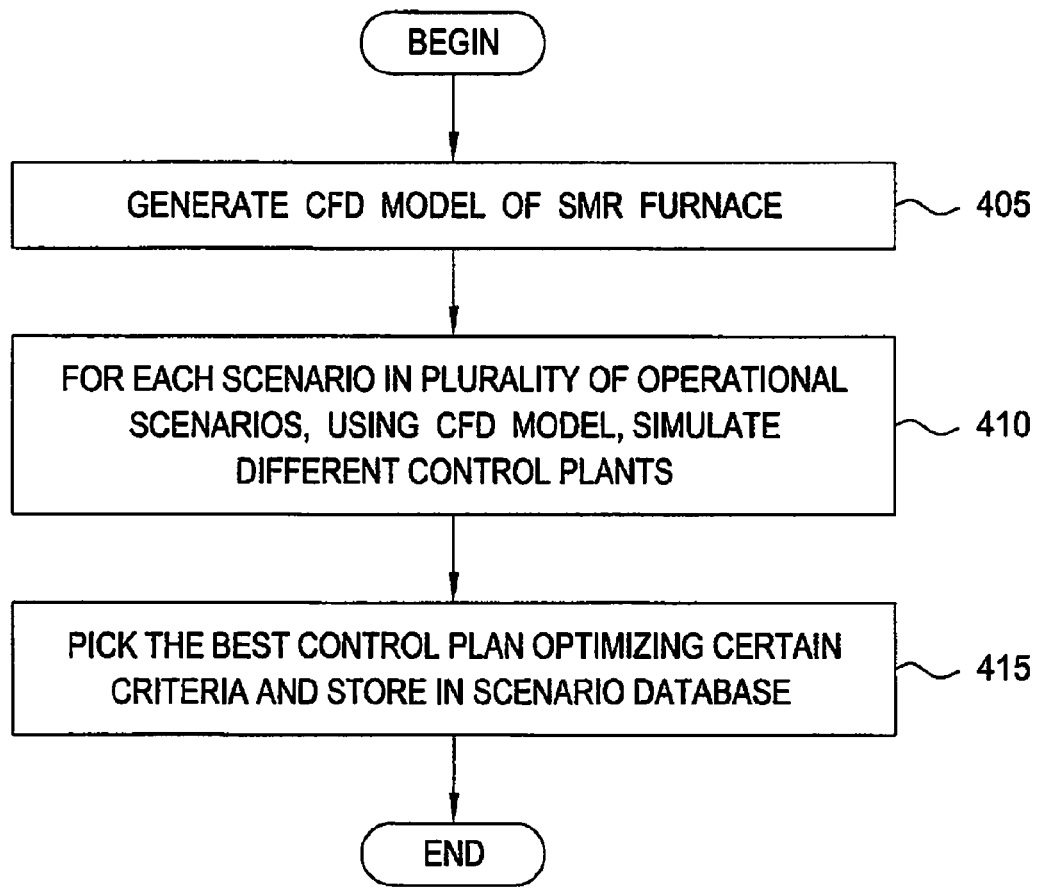
FIG. 4 illustrates a method for configuring an advanced control system for a steam hydrocarbon reforming furnace, according to one embodiment of the invention.

FIG. 4 illustrates a method for configuring an advanced control system for a steam hydrocarbon reformer furnace, according to one embodiment of the invention. As shown, the method 400 begins at step 405, where a modeling application generates a CFD model of a steam hydrocarbon reformer furnace (e.g., a steam methane reformer furnace). As noted above, such models may be generated using furnace design specifications of the steam hydrocarbon reformer furnace as well as online measurements of furnace operations. Once generated, at step 410, the CFD models may be used to simulate a plurality of operational scenarios of the steam hydrocarbon reformer furnace. For each scenario, different control plans, generated under the guidance of certain control theories or engineering experience, can be simulated. At Step 415 the best control actions against certain operation criteria are selected and stored in the scenario control database.

Figure 5:
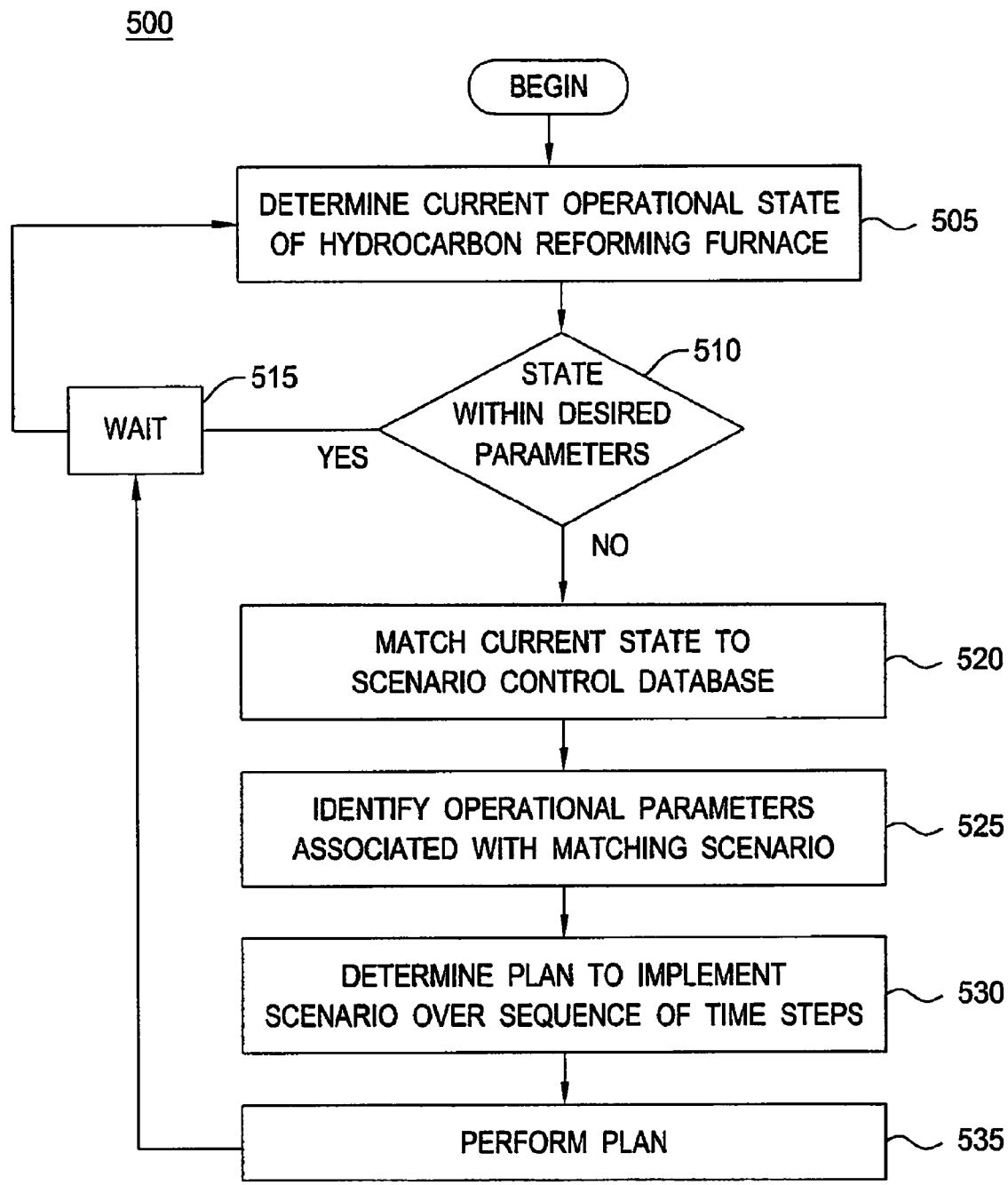
FIG. 5 illustrates a method for operating an advanced control system for a steam hydrocarbon reforming furnace, according to one embodiment of the invention.

FIG. 5 illustrates a method 500 for operating an advanced control system for a steam hydrocarbon reforming furnace, according to one embodiment of the invention. As shown, the method 500 begins at step 505 where a controller application determines a current operational state of a steam hydrocarbon reformer furnace based on current and past status of the furnace operation. At step 510, the controller application determines whether the current state is within a desired set of operational parameters. If so, then at step 515 the controller (e.g., the fuzzy logic control module 222 of FIG. 2) may wait a specified period before determining and evaluating the then current state of the steam hydrocarbon reformer furnace. Otherwise, if some parameter of the steam hydrocarbon reformer furnace has deviated from the preferred state, then at step 520, the controller application matches the current state with one or more scenarios in the scenario controller database, and at step 525 identifies the operational parameters associated with the matching scenario. At step 530, the controller application determines a plan to implement the scenario over sequence of one or more time steps. Once the plan is ready, the controller application performs the plan. For example, the controller application may pass the plan to the regulatory control system 135, which adjusts the appropriate parameters of the steam hydrocarbon reformer furnace to carry out the plan. Method 500 then returns to step 515 to wait a specified period before evaluating the then current state of the steam hydrocarbon reformer furnace.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A computer-implemented method of managing an operational state of a steam hydrocarbon reformer furnace, the method comprising:

determining, by operation of one or more computer processors, a current operational state of the steam hydrocarbon reformer furnace, wherein the current operational state specifies one or more operating parameters including at least an inlet stream pressure, an outlet stream pressure, an inlet temperature, an outlet temperature, an inlet mixture, a reaction temperature, burner fuel flow rates, and an outlet composition;

comparing the current operational state to a specified, preferred operational state;

in response to determining that the one or more parameters of the current operational state deviates from the specified, preferred operational state by a specified amount;

matching, by a controller application executing on the one or more computer processors, the current operational state to one or more operating scenarios stored in a database which relates to control strategies for the preferred operational state of the steam hydrocarbon reformer furnace, wherein each of the operating scenarios have been generated offline using a computational fluid dynamics (CFD) model of the steam hydrocarbon reformer furnace;

generating, by operation of the one or more computer processors based on the matched scenario, one or more adjustments to one or more of the operating parameters of the steam hydrocarbon reformer furnace, the one or more adjustments performed to return the steam hydrocarbon reformer furnace to the specified, preferred operational state; and performing the one or more adjustments to the one or more operating parameters of the steam hydrocarbon reformer furnace.

2. The computer-implemented method of claim 1, wherein the steam hydrocarbon reformer furnace is a steam methane reformer furnace.

3. The computer-implemented method of claim 1, wherein the controller application is a fuzzy controller application.

4. A non-transitory computer-readable storage medium containing a program configured to manage an operational state of a steam hydrocarbon reformer furnace, the program including instructions for performing an operation, comprising:

determining a current operational state of the steam hydrocarbon reformer furnace, wherein the current operational state specifies one or more operating parameters including at least an inlet stream pressure, an outlet stream pressure, an inlet temperature, an outlet temperature, an inlet mixture, a reaction temperature, burner fuel flow rates, and an outlet composition;

comparing the current operational state to a specified, preferred operational state;

in response to determining that the one or more parameters of the current operational state deviates from the specified, preferred operational state by a specified amount;

matching, by a controller application executing on one or more processors, the current operational state to one or more operating scenarios stored in a database which relates to control strategies for the preferred operational state of the steam hydrocarbon reformer furnace, wherein each of the operating scenarios have been generated offline using a computational fluid dynamics (CFD) model of the steam hydrocarbon reformer furnace;

generating, based on the matched scenario, one or more adjustments to one or more of the operating parameters of the steam hydrocarbon reformer furnace, the one or more adjustments performed to return the steam hydrocarbon reformer furnace to the specified, preferred operational state; and performing the one or more adjustments to the one or more operating parameters of the steam hydrocarbon reformer furnace.

5. The non-transitory computer-readable storage medium of claim 4, wherein the steam hydrocarbon reformer furnace is steam methane reformer furnace.

6. The non-transitory computer-readable storage medium of claim 4, wherein the controller application is a fuzzy controller application.

7. A system for managing an operational state of a steam hydrocarbon reformer furnace, comprising:

the steam hydrocarbon reformer furnace, wherein the steam hydrocarbon reformer furnace is coupled to at least one controller, the controller comprising:

a processor, and a memory storing a controller application, the controller application being configured to perform an operation comprising:

determining a current operational state of the steam hydrocarbon reformer furnace, wherein the current operational state specifies one or more operating parameters including at least an inlet stream pressure, an outlet stream pressure, an inlet temperature, an outlet temperature, an inlet mixture, a reaction temperature, burner fuel flow rates, and an outlet composition;

comparing the current operational state to a specified, preferred operational state;

upon determining that the one or more parameters of the current operational state deviates from the specified, preferred operational state by a specified amount;

matching, by the controller application executing on the processor, the current operational state to one or more operating scenarios stored in a database which relates to control strategies for the preferred operational state of the steam hydrocarbon reformer furnace, wherein each of the operating scenarios have been generated offline using a computational fluid dynamics (CFD) model of the steam hydrocarbon reformer furnace;

generating, based on the matched scenario, one or more adjustments to one or more of the operating parameters of the steam hydrocarbon reformer furnace, the one or more adjustments performed to return the steam hydrocarbon reformer furnace to the specified, preferred operational state; and performing the one or more adjustments to the one or more operating parameters of the steam hydrocarbon reformer furnace.

8. The system of claim 7, wherein the steam hydrocarbon reformer furnace is steam methane reformer furnace.

9. The system of claim 7, wherein the controller application is a fuzzy controller application.

* * * * *